Nov. 5, 1940.   A. L. McHUGH   2,220,771
SEALING DEVICE
Filed Oct. 18, 1938
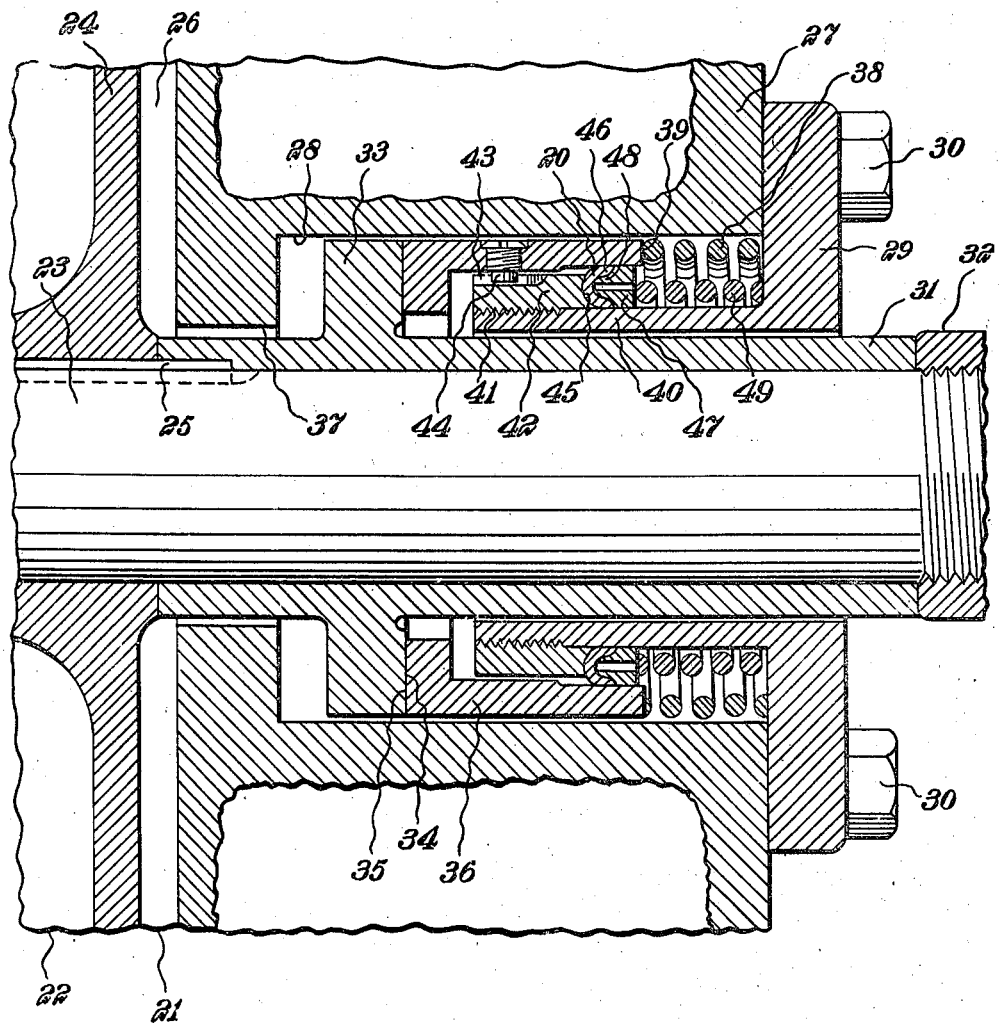
INVENTOR
Anthony L. McHugh
BY
HIS ATTORNEY Patented Nov. 5, 1940

2,220,771

UNITED STATES PATENT OFFICE 2,220,771

SEALING DEVICE

Anthony L. McHugh, Easton, Pa., assignor to Ingersoll-Rand Company, Jersey City, N. J., a corporation of New Jersey Application October 18, 1938, Serial No. 235,605

2 Claims. (Cl. 286—7)

This invention relates to sealing devices, and more particularly to a sealing device for a centrifugal pump and the like.

The invention is intended, more particularly, for use in connection with sealing devices of the type known as mechanical seals comprising a pair of sealing components which cooperate to effect a seal and operate in such wise as to valve a limited quantity of liquid therebetween in order to minimize wear on their sealing surfaces.

Usually, one component is carried by a rotary member, as for example the shaft of a centrifugal pump, and, therefore, rotates with the shaft but is incapable of longitudinal movement other than such slight endwise movement as may occur by reason of the natural clearances between the rotor of the pump and the elements serving as abutments therefor.

The other sealing component, which, as in the example shown, may be in the form of a sleeve, is restrained against rotary movement but is capable of moving longitudinally with respect to the rotor and, therefore, with respect to the sealing component carried by the rotor.

The sealing components are arranged directly in the chamber which they are intended to seal and from which the fluid is valved. The opposed ends of each component are subjected, in some degree, to the pressure of the fluid within the chamber and, inasmuch as the sleeve-like component is a floating member, it is essential that additional sealing means be provided to prevent fluid from flowing through it.

In known structures, attempts have been made to seal the interior of the reciprocatory component or sleeve by means of a spring-pressed plastic sealing member seated against the inactive end of the sleeve. This arrangement has been found to be often unsatisfactory for the reason that, when the sleeve moves away from the rotary component, the plastic seal must of necessity be moved out of its normal sealing position and may be restrained from following the return movement of the reciprocatory component by solids that accumulate on the surfaces over which the plastic sealing member slides. Thus, the plastic sealing member may assume a position in which an open path is established between it and the end of the reciprocatory component and fluid in uncontrolled quantities may flow directly from the chamber and through associated channels to the exterior of the pump.

It is accordingly an object of the present invention to preclude the possibility of passing liquid from the chamber containing the sealing device through channels other than that defined and controlled by the components of the mechanical sealing device.

Another object is to enable the plastic sealing member to remain stationary and unaffected by the movements of the mechanical sealing device.

A further object is to eliminate the necessity of frequently disassembling portions of the pump in order to assure adequate sealing of its end or ends.

Other objects will be in part obvious and in part pointed out hereinafter.

The figure in the accompanying drawing, and in which similar reference numerals refer to similar parts, is a longitudinal elevation, partly in section, of a sealing device constructed in accordance with the practice of the invention and a portion of a pump and its stuffing box to which the sealing device is applied.

Referring more particularly to the drawing, 20 designates the sealing device, and 21 a pump embodying it.

The pump, which is illustrated as being of the centrifugal type, comprises a casing 22, a shaft 23 extending through the casing, and an impeller 24 mounted on the shaft and secured against rotational movement with respect thereto by a key 25. In the example illustrated, the impeller 24 constitutes the final stage impeller, and the chamber 26 wherein it lies is, therefore, subjected to the final discharge pressure of the fluid pumped.

At the end of the casing 22 is a stuffing box 27 through which the shaft 23 extends loosely and the outer end of the bore or chamber 28 in the stuffing box 27 is closed by a cover 29 which is secured to the stuffing box by bolts 30.

The shaft 23 also extends through the cover 29 and on that portion of the shaft lying within the stuffing box is a sleeve 31 which is engaged by the key 25 and seats against the impeller 24. A nut 32 threaded to the shaft 23, exteriorly of the stuffing box, presses the sleeve 31 firmly against the impeller.

The sleeve 31, therefore, rotates with the shaft, and on its periphery is a flange 33 of which the end surface most remote from the impeller constitutes a sealing surface 34. This sealing surface cooperates with a sealing surface 35 of a sleeve 36 encircling the shaft to seal the chamber 28. More specifically, the surfaces 34 and 35 act to valve a controlled flow of fluid from the chamber 28, as for example in quantities that are merely sufficient to prevent body contact between the surfaces 34 and 35 and thereby prevent excessive wear of the sealing members.

The pressure of the fluid in the chamber 28, in the present instance, is of the same value as the final discharge pressure, the chamber 28 being in direct communication with the chamber 26 through the aperture 37 in the casing 22 through which the shaft 23 and the sleeve 31 extend. The sleeve 36 is capable of moving longitudinally of the stuffing box and is urged toward the sealing surface 34 by a spring 38 interposed between the sleeve 36 and the cover 29. The force of the spring 38 is augmented by the pressure of the fluid in the chamber 28 acting against the end surface 39 of the sleeve against which the spring 38 seats, and the combined forces of the spring and the pressure of the fluid acting against the surface 39 may be equal to, or slightly exceed, the pressure gradient of the fluid flowing between the surfaces 34 and 35.

In accordance with the practice of the invention the cover 29 is provided with an integral sleeve 40 which encircles the sleeve 31 from which it is spaced a slight distance and extends into the sleeve 36. The free end of the sleeve 40 is provided with external threads 41 to threadedly receive a collar 42 having a notch 43 in its outer surface to accommodate the end of a screw 44 carried by the sleeve 36 to prevent rotational movement of the latter sleeve.

In the end of the collar 42 opposed to the cover 29 is a seating surface 45, concave in the present instance, for the curved surface of a plastic cup packing ring 46 which is interposed between the sleeves 36 and 40 in such wise that one lip of the packing ring engages the peripheral surface of the sleeve 40 and the other lip of the packing ring engages the inner surface of the sleeve 36.

In order to suitably support the lips of the packing ring 46 and maintain them in firm sealing engagement with the sleeves 36 and 40 a ring 47 is disposed in the sleeve 36 and has an attenuated annular portion or rib 48 extending into the packing ring to prevent the latter from collapsing.

The ring 47, as will be readily appreciated, may be an integral portion of the sleeve 40 since the collar 42 is readily removable from or adjustable on the sleeve 40. As a preferred arrangement, however, the ring 47 is formed as a separate element and is pressed into contact with the packing ring by a spring 49 which also supplies the force for holding the packing ring firmly against the seating surface 45 and is interposed between the ring 47 and the cover 29.

In practice, the present invention has been found to be highly desirable for the purpose described since it efficiently seals the interior of the reciprocatory component of the mechanical seal and will not be shifted from its sealing position by the action of said reciprocatory component.

I claim:

1. In a sealing device, the combination of a casing having a chamber for fluid and a rotor having a sealing surface, an annular sealing member reciprocable with respect to the sealing surface and cooperating therewith to valve fluid from the chamber, a spring to press the annular sealing member against the sealing surface, a stationary sleeve extending into the sealing member, a plastic cup packing ring interposed between and engaging the peripheral surfaces of the sealing member and the sleeve, means encircling the sleeve extending into the packing ring to support said packing ring, a spring other than the first mentioned spring acting against said means to compress the packing ring and a ring threadedly connected to the sleeve to hold the packing ring against the said means.

2. In a sealing device, the combination of a casing having a chamber for fluid and a rotor having a sealing surface, an annular sealing member reciprocable with respect to the sealing surface and cooperating therewith to valve fluid from the chamber, a spring to press the annular sealing member against the sealing surface, a stationary sleeve extending into the sealing member, a plastic cup packing ring interposed between and engaging the peripheral surfaces of the sealing member and the sleeve, a ring threadedly connected to the sleeve to act as an abutment for the packing ring, a ring slidable on the sleeve extending into the packing ring and having channels to admit fluid from the chamber into the packing ring, and a spring other than the first mentioned spring to press the last mentioned ring against the packing ring for compressing said packing ring.

ANTHONY L. McHUGH.